May 27, 1958    E. C. CHAPMAN    2,835,966
METHOD OF WELDING
Filed Oct. 1, 1956
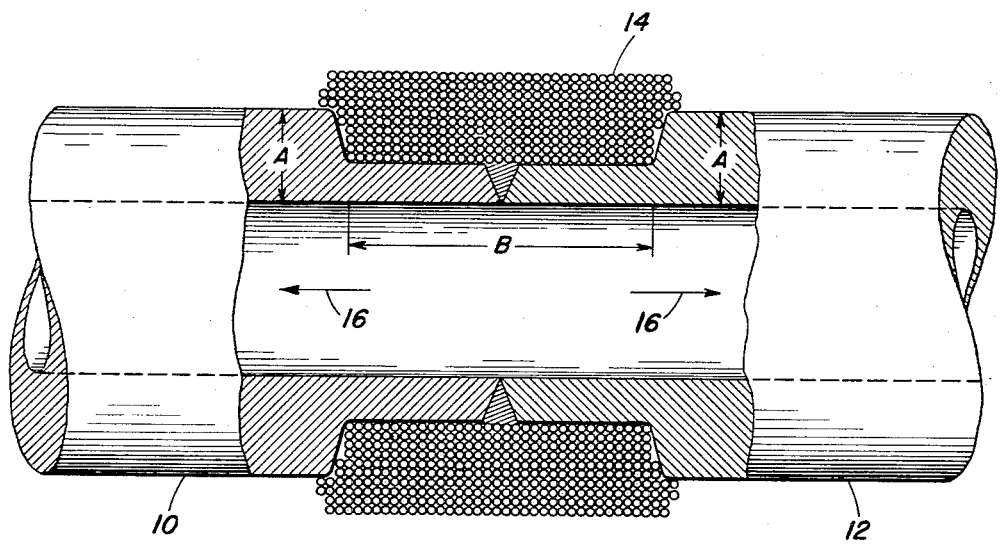
INVENTOR.
E. Corbin Chapman
BY Eldon H. Luther
ATTORNEY

United States Patent Office 2,835,966
Patented May 27, 1958

2,835,966
METHOD OF WELDING

Edward Corbin Chapman, Chattanooga, Tenn., assignor to Combustion Engineering, Inc., New York, N. Y., a corporation of Delaware Application October 1, 1956, Serial No. 613,240

2 Claims. (Cl. 29—470.5)

This invention relates to an improved method of butt joining tubes and particularly to a method of butt joining very thick walled tubes wherein at least one of the tubes is of an austenitic steel alloy suitable for withstanding extremely high pressures and temperatures.

With the advent of the so-called supercritical boilers wherein steam pressures of 5000 p. s. i. and steam temperatures of 1100° F. and above are encountered, one of the serious problems that is encountered is the butt welding of thick walled austenitic steel alloy tubes that are necesarily employed in these boilers. It will be appreciated that in order to withstand these very high pressures at these very high temperatures the tubes must be fabricated of an alloy employing high percentages of chromium, nickel and perhaps other metals such as molybdenum, cobalt, columbium, etc., and that in addition the walls of the tubes must be extremely thick. As the wall thickness of these high alloy austenitic steel tubes increases the difficulty in satisfactorily welding the same also increases with it being extremely difficult with wall thickness of about 1 to 1¼ inches and above to obtain welded joints that are entirely satisfactory and do not fail. The precise reason for this has been the subject of dissertation by numerous experts with it being generally concluded that exactly what factors are involved and what effect each factor has is not known, although it is known that one of the main contributing factors to failure of these joints is the low hot ductility of austenitic stainless steel which results in the development of high residual welding stresses when the method of welding is one in which the weld is built up of multi-layers and with such methods being the most practical ones for welding these tubes. Thick walled austenitic steel alloy tubes have low hot ductility because this metal possesses this property when it does not have a very fine grain size and no method has yet been found to furnish the desired grain size with thick wall tubes. Since the failures occur in the heat effected zone of the welded joint it is generally agreed that some sort of metallurgical change occurs in this zone during the welding process which results in serious embrittlement. In addition, when a high alloy austenitic steel is welded to a ferritic steel carbon migration during heat treating or in service causes weakness at the fusion line so that it is important to maintain the area of and residual welding stresses in these joints low with this combination thus giving an even more serious problem. With wall thickness in the neighborhood of one half inch the problem does not exist, i. e., the failure of welded butt joints where at least one of the tubes is an austenitic steel alloy generally does not occur while with a wall thickness of about one inch failure of some joints will be experienced with failure becoming more frequent as the wall thickness is further increased with there being no precise thickness below which failure will not occur and above which failure will occur. The joint failures that are here being referred to and with which the present invention is concerned are not due to an initially defective weld. When initially made the weld will seemingly be perfect with there being no cracks present in the joint. However during stress relieving or in service cracks may develop in the heat effected zone causing failure of the joint and, as mentioned before, as the wall thickness increases beyond about one inch experience has shown that there are a greater number or percentages of such failures. Not all nor even a high percentage of the butt joints of thick walled austenitic steel alloy tubes have failure in service, but a sufficient number fail to constitute a very serious problem. It may, in general, be said that in every steam piping system employing 347 stainless steel (this being the only austenitic steel alloy used in steam piping up to now) where the tube wall thickness is about one inch or more, one or more of the butt joints have failed in the service. The building up of welds by multi-layers which is the welding method with which the invention is concerned may be accomplished in any of the well known processes such as electric arc or oxy-acetylene.

To overcome this difficulty the present invention makes use of the fact that the longitudinal stress in a conduit as a result of the development of high pressure within the conduit is approximately only one half of the circumferential stress so that the wall thickness at the location of the juncture of these tubes may be reduced approximately one half of its original dimension with the resulting welding of these tubes at the location of this reduced wall thickness having the required strength to resist the longitudinal stress developed and with additional means being wrapped about the juncture of the tubes throughout the entire length of the reduced wall portion to provide the required strength necessary to resist the circumferential stress developed, with this additional means adding nothing in the way of resisting the longitudinal stress. Advantage is also taken of the fact that with a wire wrapping about this joint of reduced wall thickness uniform stress throughout the full length of the joint may be had with this being extremely important in high temperature and high pressure work and furthermore the joint may be wrapped so that the re-enforcing is substantially greater than that theoretically required to withstand the designed conditions thereby resulting in greatly reducing the stress within the weld.

In accordance with the present invention the tubes, at least one of which is austenitic steel alloy high in chromium-nickel content and of a wall thickness so that a butt weld may crack in service, have their wall thickness substantially reduced adjacent the ends to be joined together with this reduction of wall thickness being effected by reducing the outside diameter of the tubes adjacent these ends relative to that of the remaining portion of the tubes while maintaining the inside diameter substantially unchanged. These tubes are then positioned in coaxial juxtaposed relation and the ends welded together by a method involving building up the weld by means of multi-layers of weld metal. Thereafter, wire is wound around the reduced portion of these ends in helical layers, throughout the entire axial length thereof and to a radial extent so that the weakening in hoop strength occasioned by the reduction in wall thickness is greatly more than offset and with the coefficient of thermal expansion of the wire so wrapped around the tubes being the same as that of the tubes. The reduction in wall thickness must not exceed one half of its original dimension and is preferably somewhat less than that in order to be sure that the joint has sufficient strength to resist the longitudinal stress developed by the pressure fluid in the pipe. However, it is generally desirable to reduce the wall thickness to somewhat below one inch if possible in order to substantially eliminate the possibility of cracking of the joint and thus with a wall thickness of one and one quarter inch and up the maximum permissible reduction would be resorted to.

It is accordingly an object of this invention to provide an improved method of satisfactorily butt joining a pair of tubular members at least one of which is an austenitic steel alloy high in chromium-nickel content and which tubes have a wall thickness such that an ordinary butt welded joint may fail in the effected zone during service.

Other and further objects of the invention will become apparent to those skilled in the art as the description proceeds.

The invention will be more fully understood from the following description when considered in conjunction with the accompanying drawing forming a part thereof and in which the single figure represents a longitudinal sectional view of a butt joint made in accordance with the invention.

Referring now to the drawing there is depicted therein a pair of tubular members 10 and 12 which have their ends disposed in coaxial relation. Both of these tubes may be of an austenitic steel high in chromium-nickel content (such as 347 stainless steel) or one may be of such a metal while the other may be of ferritic steel. The wall thickness, indicated as A in the drawing, is in the neighborhood of one inch or greater so that upon butt welding the tubes by a method involving building the weld up by multi-layers the joint may, as experience has shown, crack in service along the heat effected zone adjacent the weld.

The wall thickness of these tubes is reduced for a short distance from the ends that are to be joined together by reducing the outside diameter of the tubes with the inside diameter remaining unchanged so as to provide a uniform flow area after the tubes are joined. The tubes have their wall thickness reduced in this manner sufficiently, if possible, so that assurance will be had that the resulting joint will not crack in service, with the maximum allowable reduction, which is slightly less than one half the original thickness, being had with tube walls of one and one quarter inches and more. After effecting this reduction in wall thickness the tubes are positioned in coaxial relation and welded together by a process involving the building up of multi-layers.

After the tubes have been welded together the joint is wrapped with wire 14 which must have the same coefficient of thermal expansion as the tube metal. The wire wrapping extends throughout the entire axial length of the reduced end portions, i. e., throughout the distance indicated as B, with the wire being wrapped in helical fashion and many more layers being provided than is required to offset the decrease in hoop strength that is occasioned by the reduction in wall thickness of the tubes. This greatly reduces the stress within the weld over that which would prevail if only the amount of re-enforcing that is theoretically required were used and accordingly decreases the likelihood of failure of the weld.

It is essential that the wrapping be wire because it is necessary that there be uniform stress throughout the extent of the reduced portion of the joined tube ends since otherwise uneven stresses would develop in the proximity of the weld because of the very great changes in pressure and temperature to which it would be subjected in boiler operation and these uneven stresses would be very likely to cause failure of the weld. Because wire has very fine grain size and accordingly good hot ductility, all the turns of the wire will eventually take uniform stress even though the wrapping may initially not be uniform wherefore the stress in the reduced wall portions of the tubes will also be uniform and accordingly the stresses in the vicinity of the weld will be uniform.

Since the longitudinal stresses acting in the direction of arrows 16 will be only half the circumferential stresses in the tube wall occasioned by the action of the pressure within the tubes, the wall thickness adjacent the ends that are to be joined together may be reduced to approximately one half of its theoretically required thickness. When this done the weld is sufficiently strong to withstand the longitudinal stresses and the reduced wall thickness together with wire wrapping 14 is more than sufficient to withstand the circumferential stresses developed by the pressure within the tubes.

Thus with the method of this invention the problem of butt welding tubes at least one of the tubes which is of an austenitic steel alloy high in chromium-nickel content and of a wall thickness such that a butt weld built up of multi-layers may crack along the heat effected zone during service is overcome or greatly reduced. If the wall thickness is such that when reduced to one half its original value it lies within the range where this cracking is not experienced the problem relative to that tube will be solved while if the wall is so large that, when reduced to one half its original value, it is still outside this range where no cracking is experienced then the problem is not completely solved but is greatly reduced since, as mentioned previously, the greater the wall thickness the greater the likelihood of cracking.

It will be understood that the above description is intended for the purpose of illustration only and that modifications such as will occur to those skilled in the art are possible and are embraced within the scope and spirit of the invention.

What I claim is:

1. The method of butt joining a pair of tubes at least one of which is an austenitic steel alloy high in chromium-nickel content and having a wall thickness of one inch or more so that a butt welded joint formed by a multi-layer weld is likely to crack in service along the effected zone, comprising reducing the wall thickness thereof adjacent the ends to be joined as near as possible to a thickness such that this cracking in service will not occur but not more than one half of the original wall thickness, positioning said ends in coaxial juxtaposed relation, welding the end surfaces of these reduced end portions together by a process involving building the weld up of multi-layers, winding wire under predetermined tension about said reduced portion of said ends throughout the axial length thereof and to a radial extent sufficient so that weakening in hoop strength occasioned by the reduction in wall thickness is substantially more than offset with the wire being wound in helical fashion with axially adjacent windings being juxtaposed said wire having a coefficient of thermal expansion that is substantially the same as that of the elements.

2. The method of butt joining a pair of austenitic steel alloy tubes high in chromium-nickel content and having a wall thickness greater than about one inch, comprising reducing the wall thickness of the tubes adjacent the ends to be joined to approximately but not more than one half the original wall thickness, effecting such reduction by reducing the outside diameter adjacent these ends relative to that of th remaining portion of the tubes while maintaining the inside diameter substantially unchanged, positioning said ends in coaxial relation, welding the end surfaces of these reduced end portions together by a process involving building the weld up of multi-layers, winding wire in close helical fashion to produce tight coils and under predetermined tension about said reduced portion throughout the full axial extent thereof a plurality of times thereby forming a plurality of superimposed helical coils with there being a sufficient number of such coils so that the resulting hoop strength at the location of the reduced wall portion will be substantially greater than that in the remaining portion of the tubular members, said wire having a coefficient of thermal expansion that is substantially the same as that of the elements.

References Cited in the file of this patent

UNITED STATES PATENTS

| | | |
|---|---|---|
| 2,373,038 | Lindsay | Apr. 3, 1945 |
| 2,391,747 | Schoessow | Dec. 25, 1945 |